Figure 1:
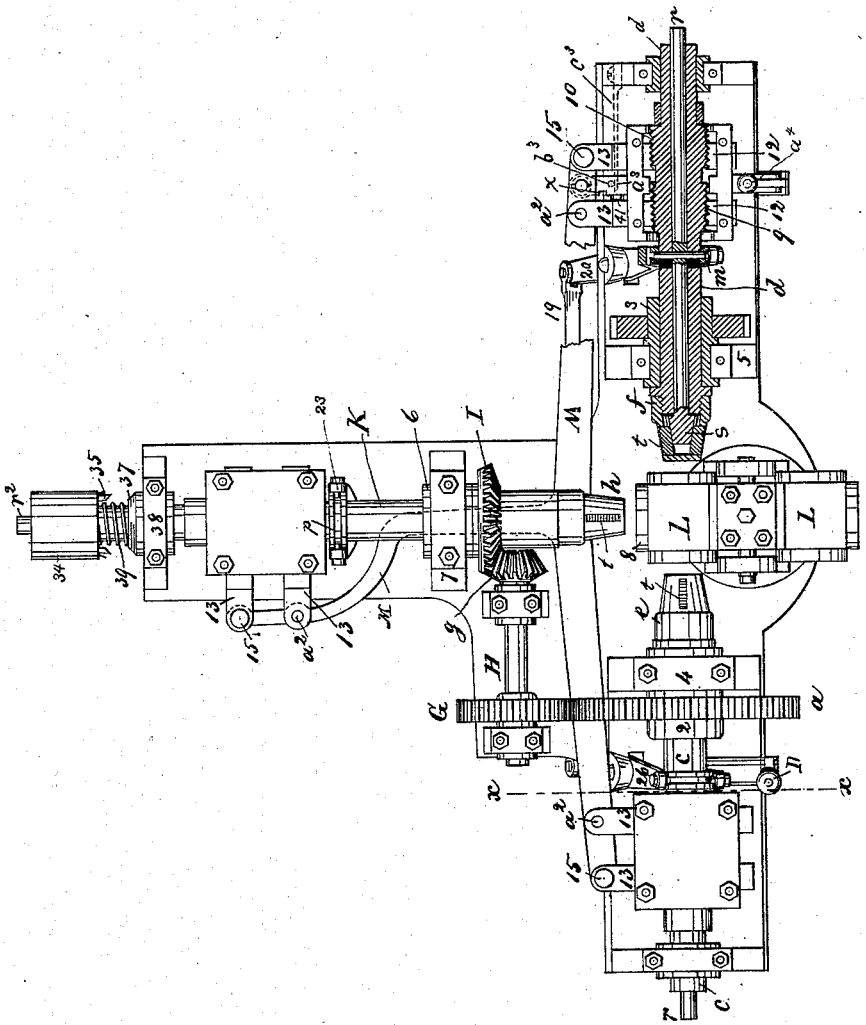

(Model.)

3 Sheets—Sheet 1.

C. C. WALWORTH.
MACHINE FOR TAPPING AND REAMING.

No. 252,068.                    Patented Jan. 10, 1882.

Witnesses.
Jos. P. Livermore
L. T. Connor

Inventor.
Caleb C. Walworth
by Crosby Gregory
Attys.

(Model.) 3 Sheets—Sheet 2.
C. C. WALWORTH.
MACHINE FOR TAPPING AND REAMING.
No. 252,068. Patented Jan. 10, 1882.
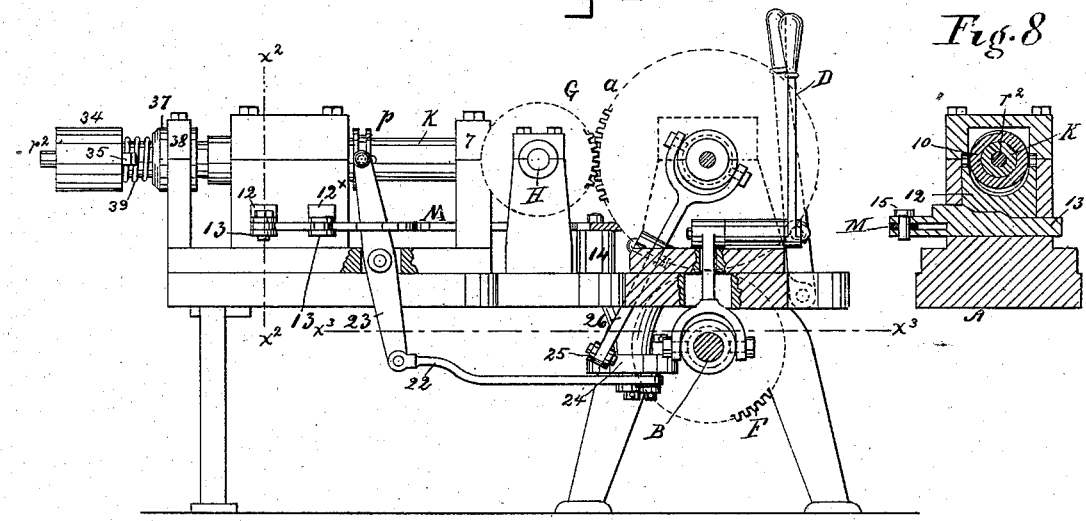
Fig. 2.
Fig. 8
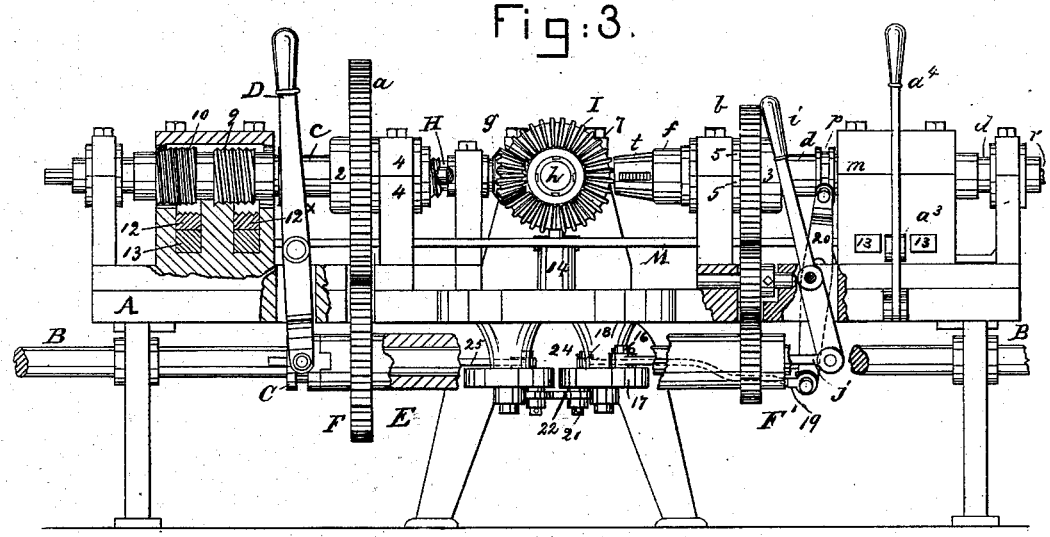
Fig. 3.
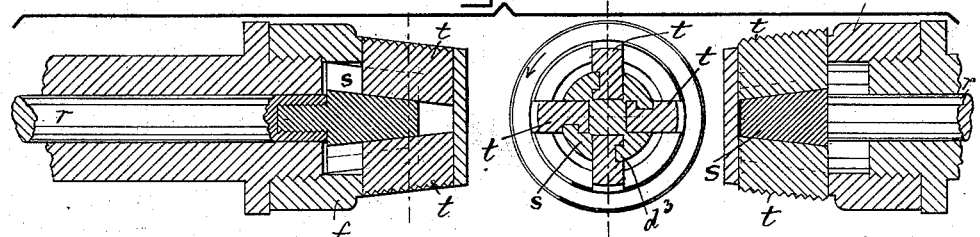
Fig. 4.
Witnesses
Jos. P. Livermore
L. F. Connor
Inventor
Caleb C. Walworth
by Crosby Gregory
Attys.

(Model.)   C. C. WALWORTH.   3 Sheets—Sheet 3.
MACHINE FOR TAPPING AND REAMING.

No. 252,068.   Patented Jan. 10, 1882.

Witnesses.
Jos. P. Livermore
L. F. Connor.

Inventor.
Caleb C. Walworth
by Crosby Gregory
Attys.

UNITED STATES PATENT OFFICE.

CALEB C. WALWORTH, OF BOSTON, MASSACHUSETTS.

MACHINE FOR TAPPING AND REAMING.

SPECIFICATION forming part of Letters Patent No. 252,068, dated January 10, 1882.

Application filed April 19, 1880. (Model.)

*To all whom it may concern:*

Be it known that I, CALEB C. WALWORTH, of Boston, county of Suffolk, State of Massachusetts, have invented an Improvement in Tapping and Reaming Machines, of which the following description, in connection with the accompanying drawings, is a specification.

This invention relates to mechanism for tapping or reaming gas, water, and steam pipe fittings which it is desired to provide with female threads. In this instance I have shown my improved mechanism embodied in a tapping machine; but in order that the same may be employed to ream out a fitting previous to tapping it, it is necessary only to change the threading-cutters to reaming-cutters of usual construction. In this my invention I have shown several expanding-taps, each one of which is controlled by a suitable lever by which to bring it into operative position and move outwardly the cutters, after which threaded half-nuts are moved to engage screw-threads attached to the tap-carrying spindle, in order to feed the same forward at the proper time and speed to insure the proper operation and forward movement of the tap and the projection and withdrawal of its cutters. The tap and cutters being in position to cut the fitting and the half-nuts in position to feed the spindle and tap forward, a suitable lever, under control of the operator, is moved to cause a clutch splined upon the main rotating shaft to engage a sleeve or hollow shaft, on which is secured the toothed gear, that by its engagement with other gears positively rotates the sleeve and tap. Thus far I have followed and referred to the operation of but one spindle and tap; but it will be seen from the drawings that the hollow shaft has two toothed gears to operate through other gears the two main spindles and taps, and also the spindle and tap for cutting the outlet of the fitting, said spindle being at right angles, or nearly so, to the other spindles. It will also be observed that the half-nuts for each of the said spindles are all operated simultaneously, and I have herein shown with each spindle two half-nuts having threads of different pitch, to enable me in one machine to cut threads of different pitch. The threads having been cut in a machine such as herein described, it having three spindles and taps, a rod provided with a cutter-expanding head or device is automatically operated to retract or draw back the cutters, after which the three spindles and taps with retracted cutters are quickly drawn back away from the fitting, two of them being moved in directly opposite directions, while the third spindle is moved away from the other two at right angles without reversing the rotation of the spindles, which as usually practiced causes a great loss of time. In the machine herein shown I am enabled to simultaneously use two or more taps, and yet avoid this reverse rotation and consequent loss of time, and my present invention is therefore an improvement upon the machine described in United States Patent No. 15,860, granted to me October 7, 1856.

Figure 5:
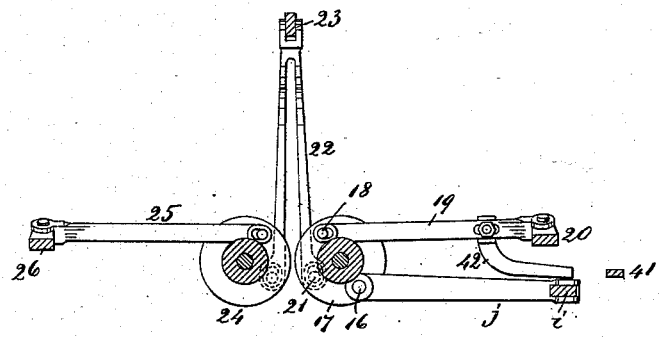
Figure 9:
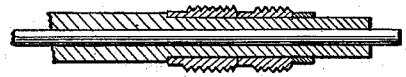
Figure 6:
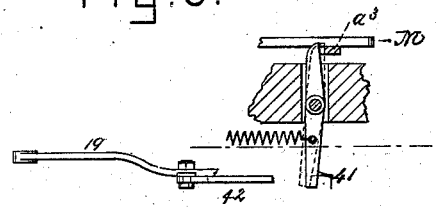
Figure 7:
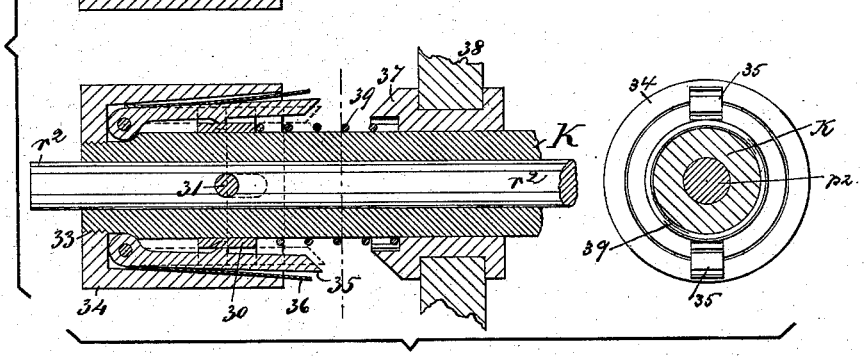

Figure 1 represents, in top view, a machine embodying my improvements; Fig. 2, a left-hand end elevation and partial section of Fig. 1 on the line $x\,x$; Fig. 3, a front elevation, also partially in section, the tap and die at the left-hand end of the machine and the chuck for holding the fitting being omitted; Fig. 4, sectional details of the tap, cutters, spindles, tap expanding and contracting device, and its rod; Fig. 5, a detail of the mechanism for moving the tap-bearing spindles, the said parts being in position to be moved so as to carry the spindles forward; Fig. 6, a detail representing the tripping devices to automatically release the half-nuts; Fig. 7, sectional details of the devices connected with one of the spindles and rod to impart the initial or starting movement to all the rods to retract the cutters; Fig. 8, a sectional detail on the line $x^2\,x^2$, Fig. 2; and Fig. 9 is a modification showing the bosses or threaded parts, to be hereinafter referred to, as made upon independent sleeves placed about the spindle.

The frame A of the machine will be of suitable shape to properly support the working parts.

The constantly-driven main shaft B, long enough to drive one or more machines in line, has splined upon it a clutch, C, under the control of a lever, D, the said clutch being adapted to engage the end of a hollow shaft, E, having upon it toothed gears F F', that drive the toothed wheels $a\,b$, attached to quills 2 3 in bearings 4 5, the said quills being each splined to the main spindle $c$ or $d$, about which it is placed. These spindles have secured to them the taps $ef$, they being attached to the said spindles, as herein shown, by screw-threads, as at the right of Fig. 1.

The gear $a$ on spindle $c$ engages gear G on shaft H, which is provided with a bevel-gear, $g$, that in turn drives the larger bevel-gear I, fast upon the quill 6 in the bearing 7, the said quill 6 being splined upon the spindle K, provided at its front end with the tap $h$, to thread the outlet 8 of the fitting (see Fig. 1) held in the revolving vise—a contrivance substantially such as shown and described in United States Patent granted to myself, No. 15,862, dated October 7, 1856, the said vise differing only in that in the one herein shown the vise revolves about a horizontal axis, while in the patent the vise revolves about a perpendicular axis. Each of these spindles, properly supported in bearings on the frame-work, has formed as part of or attached to it one or more (preferably two) bosses, 9 10, each provided externally with screw-threads of a proper pitch to produce in the fitting a screw-thread of the desired pitch.

These two bosses, alike for each spindle, are shown clearly in Figs. 1 and 3, and in the latter figure it will be clearly seen that the bosses 9 have a coarser thread than the bosses 10. Under each of these bosses is placed a half-nut, 12 or $12^\times$, having a thread of corresponding pitch, and under the said half-nuts are placed nut-lifting devices 13, (shown as wedges,) having preferably two shoulders, so as to permit the nuts above them to be lifted into engagement with the threads of the bosses, and thereafter rest on horizontal surfaces, to thus obviate any possibility of moving the wedges backward by pressure. (See Fig. 8.) One of these wedges, in connection with each spindle, according to the half-nut being used, is connected with a lever, M, (see Figs. 1, 2, and 3,) having its fulcrum at 14. The said lever is herein shown as a three-armed lever, adapted to be connected by a pin, 15, with the slotted end of one of the wedges for that half-nut of each spindle which it is desired to use. This pin may readily be changed from the position shown in the drawings, Fig. 1, wherein the lever M is connected with the series of wedges that operate the half-nuts 12, to the holes $a^2$ of the series of wedges adjacent thereto, which operate the half-nuts $12^\times$.

The half-nuts not in use are kept down away from the bosses by a suitable spring, the wedge under it being then withdrawn. The fitting being properly held in the revolving vise, the spindles are moved forward to place the taps $efh$, or as many of them as may be used, into or at the entrance of the openings of the fitting to be operated upon. This is done by means of a lever, $i$, connected by link $j$ with a pin, 16, (see Fig. 5,) of a wheel or lever, 17, which, by another pin, 18, actuates a link, 19, connected with the lever 20, to be hereinafter referred to.

The wheel or lever 17 is connected by pin 21 with a compound link, 22, attached to a lever, 23, and also to the wheel or lever 24. This latter wheel or lever is connected by link 25 with lever 26. Each of these levers 20 23 26 has its upper end forked (see Fig. 2) to embrace an annularly-grooved collar, $p$, which surrounds the spindle. Each of these collars carries a pin, $m$, that is secured thereto at each end, it having been passed through elongated slots in the spindle and through a hole in the rod $r$ or $r^2$, of the same diameter as the said pin, so that the respective rods $r$ or $r^2$ partake of all the movements of the levers, thus permitting them to be moved horizontally, according to the length of the slots in the spindles, without moving the spindles with them, to thus enable the said rods, by their connected expanding and retracting devices $s$, to positively expand or push outward the cutters $t$, or retract them at the proper times, according to the direction of movement of the rods $r$ or $r^2$, the forward movement expanding the taps. The taps having been expanded, the pins $m$ strike the ends of the slots and move all the spindles forward.

At the right-hand end of Fig. 1 I have shown the quill, spindle, tap, &c., in section, and the black space next the pin $m$ represents slots in the spindle. Each spindle and connected parts so far described is like the other in the particulars stated, so I need not make a detail description of each. All the taps being in place, with the cutters expanded, the rotation of the spindles in engagement with the half-nuts causes all the spindles to travel forward and force the taps into the fitting, cutting the desired screw-thread, or, if a reamer is attached thereto, reaming out the ends of the fitting. The taps, having entered the fitting the proper distance and cut the threads, are immediately retracted, as will now be described.

The rod $r^2$, located at the center of the spindle K, for moving the expanding devices to force out or draw in the cutters $t$, has a collar, 30, connected with it by a pin, 31. This pin 31 is also extended through slots 32 (see Fig. 7) in the spindle K.

Connected with the spindle K by screw-threads 33 is a cap or box, 34, containing a number of pivoted clutches, 35, controlled by springs 36, thus forming a catch-box. The catch-releaser 37 in the bearing 38 is shown as a cone. The releaser 37 is grooved to receive one end of a spiral spring, 39, the opposite end of which bears against the collar 30. As the spindles start forward the catches 35 engage the collar 30 at its rear side, causing the pin to carry the rod $r^2$ with it to keep the cutters $t$ thrown out, the pin 31 during such movement bearing against the front part of the slot in the spindle K; but just as the taps reach their farthest position in the fitting the free ends of the catches strike the conical surface of the releaser 37, causing the said catches to disengage with the collar, when the spring 39 quickly throws it backward far enough to draw back the rod $r^2$, which is like the rod $r$, Fig. 1, causing it to retract the cutters $t$, freeing them from the threads cut in the fitting, leaving the tap free to be quickly drawn out from the fitting by a longitudinal motion without rotation in a reverse direction, as most commonly practiced. This one rod $r^2$, so drawn backward by the spring 39, acts through the levers 20 23 26, before described, and their links, to simultaneously draw back the rods $r$ and retract the cutting-surfaces for each tap, leaving the taps and spindles free to be drawn from the fitting by the lever $i$, which is then operated by hand.

The lever M has pivoted to it a slide bar, $a^3$, (see Fig. 1,) having at its side a notch, $x$, to be entered by a tripper, 41, (shown clearly in Fig. 6,) which latter holds the bar $a^3$, lever M, and wedges in place, while the half-nuts are lifted to engage the bosses. The bar $a^3$ is connected with and moved by lever $a^4$, which has upon it a pin, $b^3$, that as the slide-bar lever M and wedges are moved under the half-nuts to lift them acts upon and strains a spring, $c^3$, it having sufficient strength to throw back the slide-bar and move the lever M to withdraw all the wedges when the tripper is released from the notch $x$ of the slide-bar. Just before the rods $r$ $r^2$ are to be drawn back to retract the cutters $t$ the adjustable finger 42 on the link 19 (see Figs. 5 and 6) strikes the tripper and disengages it from the said bar, and the spring $c^3$ withdraws the wedges, permitting the nuts to drop preparatory to drawing back the spindles, as described. The expanding devices or heads $s$, to positively move the cutters $t$ radially in both directions, have each four lips, $d^3$, one for each cutter, and each lip is entered into a corresponding groove or way at the side of its cutter $t$, the said lips acting as the heads $s$ are moved by the rods $r$ or $r^2$ longitudinally to positively throw the cutters outward from the center of the tap, or retract them, according to whether the rods move forward or backward.

A machine provided with the improvements herein described will greatly increase the rapidity with which fittings may be tapped and produce a better thread at less cost in time.

I have herein shown the bosses as formed directly upon the spindles; but they might be made as sleeves to be slipped over and secured to the spindles, as in Fig. 9.

I claim—

1. In a machine for tapping, substantially such as described, two or more rotating spindles and taps, combined with rods and heads adapted to positively move the cutters or dies outward and retract them independently of the movement of the spindles, substantially as described.

2. The rotating spindle, cutting devices, head, and rod $r^2$, a catch-box attached to the rod, a releasing device, and a spring to act upon the catch-box and withdraw the said rod to retract the cutters, combined with a series of levers and links operatively connected with one or more rods, $r$, of other spindles, to automatically retract the cutting devices of the other spindles, substantially as set forth.

3. The rotating spindle provided with the screw-threads and the half-nut, combined with the wedge having the two shoulders and flat surfaces to lift the half-nut and obviate retrograde motion of the wedge by reason of pressure upon the half-nut, substantially as described.

4. The rotating spindle having screw-threads of different pitch, combined with half-nuts having screw-threads of like pitch, and means to move the half-nuts to engage either of them with its co-operating screw-thread of the spindle, according to the pitch of the thread desired for the fitting.

5. In a tapping-machine, a series of tapping-spindles having screw-threads, a series of half-nuts, and wedges to move them, and a lever to simultaneously operate the wedge for each spindle and its operative half-nut, substantially as described.

6. The continuously-rotating shaft B, its clutch splined thereon, and means to move it at the proper time, combined with the hollow shaft and its attached gears, two or more rotating spindles, and means to connect and rotate them in unison, substantially as described.

7. The lever M, to operate the wedges that lift the half-nuts, combined with the bar $a^3$, connected with the said lever, a tripping device to engage and hold the bar and lever in one of its extreme positions against the action of a spring, and means to disengage the tripping device from the said bar before the cutters are retracted and prior to moving the spindles, substantially as and for the purpose described.

8. In a tapping-machine, two or more tapping-spindles having radially-movable cutters, combined with mechanism to rotate the said spindles continuously in one direction both when the spindles are being moved forward to cut a thread and when being retracted, substantially as described.

In testimony whereof I have signed my name to this specification in the presence of two subscribing witnesses.

CALEB C. WALWORTH.

Witnesses:
G. W. GREGORY,
N. E. C. WHITNEY.